though it will be realized that it may be entangled in a number of different ways.

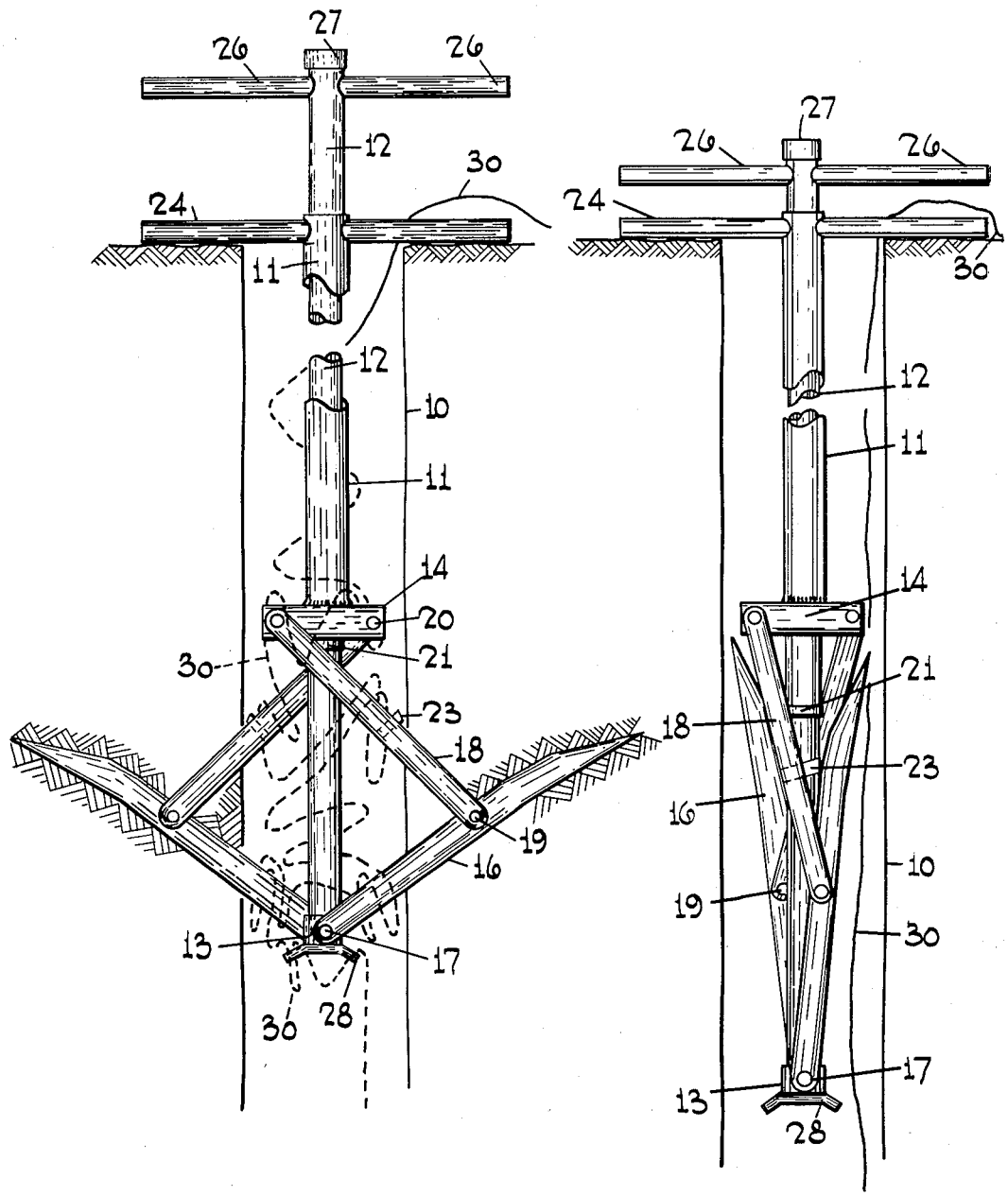

2,755,734
SHOT HOLE CAP WIRE CATCHER

John T. Smith, Texarkana, Ark., assignor to Esso Research and Engineering Company, a corporation of Delaware Application December 18, 1952, Serial No. 326,743

5 Claims. (Cl. 102—22)

This invention concerns a device for reducing safety hazards in seismic prospecting and more particularly to a device that may be placed in a seismic shot hole for the purpose of preventing cap wires fom being blown out of the hole by the seismic charge.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors known as geophones, which translate the detected motion into electrical impulses which are suitably amplified and recorded on a seismograph. The seismic record is provided with suitable timing marks so that it is possible to determine from the record the length of time required for the arrival of seismic waves at any particular point on the earth's surface, either directly from the source or by reflection from the underlying strata. From other data obtained in the area being studied, such as seismic wave velocities in the various earth layers, it is then possible to estimate the depths of the various reflecting substrata.

In seismic prospecting the most common source of energy for providing the seismic impulse is an explosive charge set off in a shot hole bored into the earth to a selected depth, say 50 to 200 feet. The explosive charge is usually detonated by electric blasting caps by means of conducting wires, referred to as cap wires, run into the bore hole from an energy source such as a battery in the seismic shooting truck.

When the seismic charge is detonated the explosive force invariably sends the cap wires out of the hole. Normally this would not be a serious hazard in open country but in a large number of instances it is convenient to run seismic surveys along section line roads. Since high voltage power lines are usually run along such roads there is danger that the cap wires will be thrown into contact with these lines, subjecting the personnel in the shooting truck to danger of injury or possible death from electrical shock.

This problem has long been recognized and a number of different devices have been invented for trapping the cap wires. All of these devices require some means for anchoring the device to the surface of the ground or for holding the device over the shot hole so that the force of the explosion will not remove the cap wire trap and thus nullify its usefulness. Thus such devices must be fastened to the shot hole casing, for example, if such is used, or must be anchored to the ground with stakes and chains, or else must be heavy enough to be held in place by weight alone. Hence the devices heretofore used have required that accessory equipment be carried along with the trapping device itself or else that the equipment must be heavy and bulky.

It is an object of the present invention to provide a simple and yet highly effective device that may be inserted in a seismic shot hole to engage the cap wires that tend to be blown from the shot hole. It is a further object of the invention to provide a unitary cap wire trap assembly that is convenient to carry, simple in construction, capable of being inserted and anchored rapidly in the shot hole and requiring no auxiliary anchoring devices.

Other objects of the invention as well as in the nature of the invention and the manner in which it may be utilized will be appreciated when consideration is taken of the ensuing description and the accompanying drawings, in which:

Figure 1 is an elevational view of one embodiment of the invention showing the anchoring arms in retracted position as the device is placed in a shot hole;

Figure 2 is an elevational view similar to Figure 1 and showing the anchoring arms in extended position engaging the walls of the bore hole.

Figure 3:
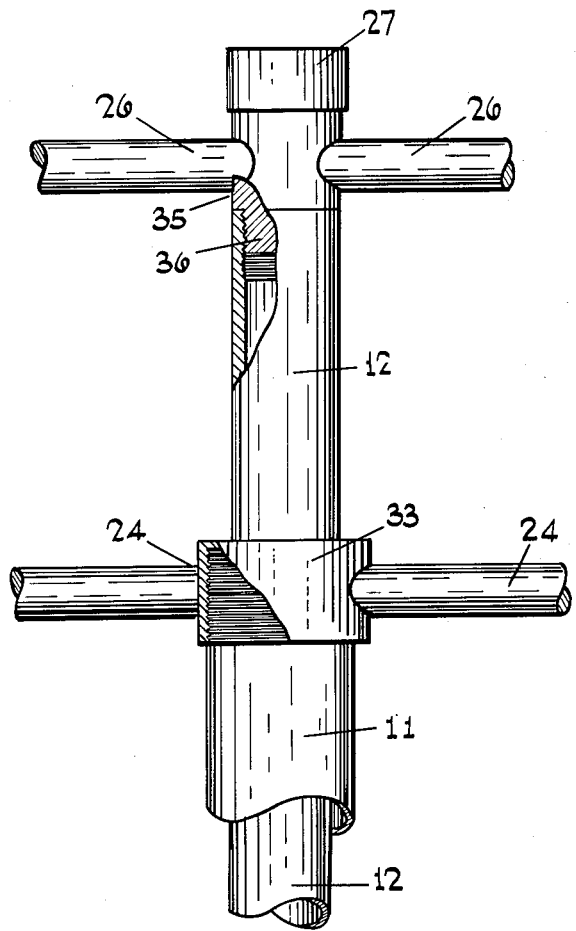
Figure 3 is a fragmentary view, partly in section, of the upper portion of an alternative embodiment of the invention.

Referring now to the drawings in detail, which show one embodiment of this invention in position in a shot hole or bore hole 10, it will be seen that the device comprises a long outer tube 11 which slidably receives an inner longer rod or tube 12, which may also be referred to as an elongated body. The lower end of member 12 has fastened thereto or as an integral part thereof a block or collar member 13 to which are pivotally attached a pair of arms 16 by means of a bolt 17. Fastened to the lower end of outer tube 11 is a block or collar member 14 to opposite sides of which tie-rods 18 are pivotally fastened by means of bolts 20, the other end of each of these rods being pivotally fastened to intermediate portions of arms 16 by means of bolts 19. The tie-rods 18 cross each other so that as outer tube 11 and inner rod or tube 12 are moved lengthwise with respect to each other the arms 16 will move inwardly or outwardly.

Fastened to the top end of outer tube 11 in perpendicular relation thereto are a pair of support members 24 of total length greater than the diameter of the shot hole or bore hole so as to span the hole and thereby prevent the device from dropping into the hole. A pair of handles 26 are fastened to the elongated body 12 adjacent its upper end at a point above the support members 24. Thus the device may be placed in a shot hole as shown and the handles 26 grasped with the hands so as to effect upward movement of the body 12 with respect to outer tube 11 so that the arms 16 will move outward into the walls of the bore hole and assume a position somewhat as shown in Figure 2. For illustration purposes the arms 16 are shown in their outermost position in Figure 2 although it will be realized that the arms will extend to this outermost position in the size shot hole shown only when the formation encountered is extremely soft.

The extent to which the arms can pivot outwardly is limited by stop 21 on which block member 14 will come to rest when handles 26 are pulled upwardly. It is preferred that arms 16 be bowed outwardly to a slight extent, as shown, to ensure more positive engagement with the walls of the hole when a narrow portion is encountered and/or where the formations are relatively hard. In addition to serving as a means for preventing the device from dropping down into the shot hole, support members 24 also serve as a member against which the operator can place his feet to facilitate pulling inner rod or body 12 upward with respect to outer tube 11 by means of handles 26.

To illustrate how the device of this invention serves to entangle the cap wires it is assumed that in Figure 2 the shot has been detonated. It will be seen that the cap wire 30 has been entangled in the arms 16 and the tie-rods 18. Conveniently, short hooks 28 may be fastened to the bottom of inner rod 12 as additional ensnaring means for the cap wire. The cap wire is represented in phantom view in all but the top portion of Figure 2 to minimize interference with the proper illustration of the device itself.

Since the arms 16 are pointed upwardly the outward force of the explosion will serve merely to drive these arms more firmly into contact with the walls of the bore hole and the device will be anchored securely and will not be blown from the hole. When it is desired to remove the device from the hole it is merely necessary to push down on handles 26 and thus cause the arms to be retracted into the position shown in Figure 1. Stops 23 fastened to the tie-rods 13 come into contact with the arms 16 as they are folded inwardly and prevent the arms from moving in to the extent that the tie-rods would be on dead center and thus make it difficult to move the arms outward when it is desired to do so.

Should it be found difficult to move handles 26 downwardly when it is desired to remove the device from the hole, cap 27 on the top of inner rod 12 may be struck with a hammer or similar instrument to loosen the arms from the walls of the bore hole. After the arms have been retracted it is a simple matter to remove the device from the bore hole by lifting up on the handles 24.

Conveniently the device may have an overall length of from eight to fifteen feet, and preferably for ease of handling a length of about ten feet. The device will thus not be unwieldly and yet will serve satisfactorily for use in the large majority of shot holes. It may be advisable, however, in some cases to provide for emergency adjustment of the length of the device when the earth formation encountered at the normal anchoring depth cannot be penetrated by the arms. One means for such adjustment is illustrated in Figure 3 which is a fragmentary view, partly in section, of the upper portion of an alternative embodiment. In this embodiment the support members 24 are not fastened directly to the outer tube 11 but are fastened to a collar 33 that is threaded onto the upper end of tube 11. Similarly, handles 26 are fastened to a plug member 35 that fits threadedly into a recess in the upper end of inner rod or tube member 12. It is thus a simple matter to remove collar 33 and add an extension to outer tube 11 by means of a conventional coupling collar, subsequently replacing collar 33 on the extension member, and to remove plug 35 from member 12 and add an extension thereto, the latter extension being provided at one end with a threaded neck portion similar to portion 36 and at its other end with a recess of the proper dimensions to receive plug 35.

To minimize weight it may be desirable to construct the cap wire catcher of aluminum. However it will ordinarily be preferable to construct it of steel, in spite of its greater weight, in view of the greater durability of the latter and in view of the fact that steel is easier to work with and to weld. To save weight, member 12 may be made of tubular material rather than of solid rod material, although it may be desirable to reinforce that portion of member 12 that extends below member 14 in the extended position of the device (Figure 2) by fastening within the bore of that portion a short length of solid rod.

It is intended that the scope of this invention be limited only by the following claims and not by the specific embodiments herein described.

What is claimed is:

1. A device for entangling cap wires employed in detonating an explosive charge in a bore hole, comprising an elongated body, an elongated tube shorter than said body and slidably receiving said body, a pair of upwardly directed pointed arms pivotally attached to the lower portion of said body, a pair of linkage arms each pivotally attached at one end to the lower end of said tube and pivotally attached at its other end to a mid portion of one of said arms, a pair of support members rigidly attached perpendicularly to the upper end of said tube on opposite sides thereof whereby to span said bore hole and to support said device in the top of said borehole, and a handle fastened to the upper projecting end of said body above said support members to raise said body relative to said tube whereby said arms will move outwardly into the walls of said bore hole.

2. Device according to claim 1 including an least one short hook member fixed to the bottom of said body.

3. Device according to claim 1 including an enlargement on said body below said tube whereby to limit the upward motion of said body relative to said tube.

4. Device according to claim 1 including stop members fixed to said linkage arms and engageable with said arms to limit the inward motion of said arms.

5. Device according to claim 1 wherein said pointed arms are bowed outward whereby to facilitate engagement with the walls of the borehole.

References Cited in the file of this patent

UNITED STATES PATENTS

| | | |
|---|---|---|
| 652,162 | Blackburn | June 19, 1900 |
| 772,515 | Jackman | Oct. 18, 1904 |
| 857,881 | Johannessen | June 25, 1907 |